July 6, 1965 R. A. RICHARDSON 3,192,750
SEQUENCE CONTROL FOR MACHINE RAM
Filed Jan. 2, 1962 6 Sheets-Sheet 1

INVENTOR.
ROLLAND A. RICHARDSON
BY
Bruce & Brosler
HIS ATTORNEYS

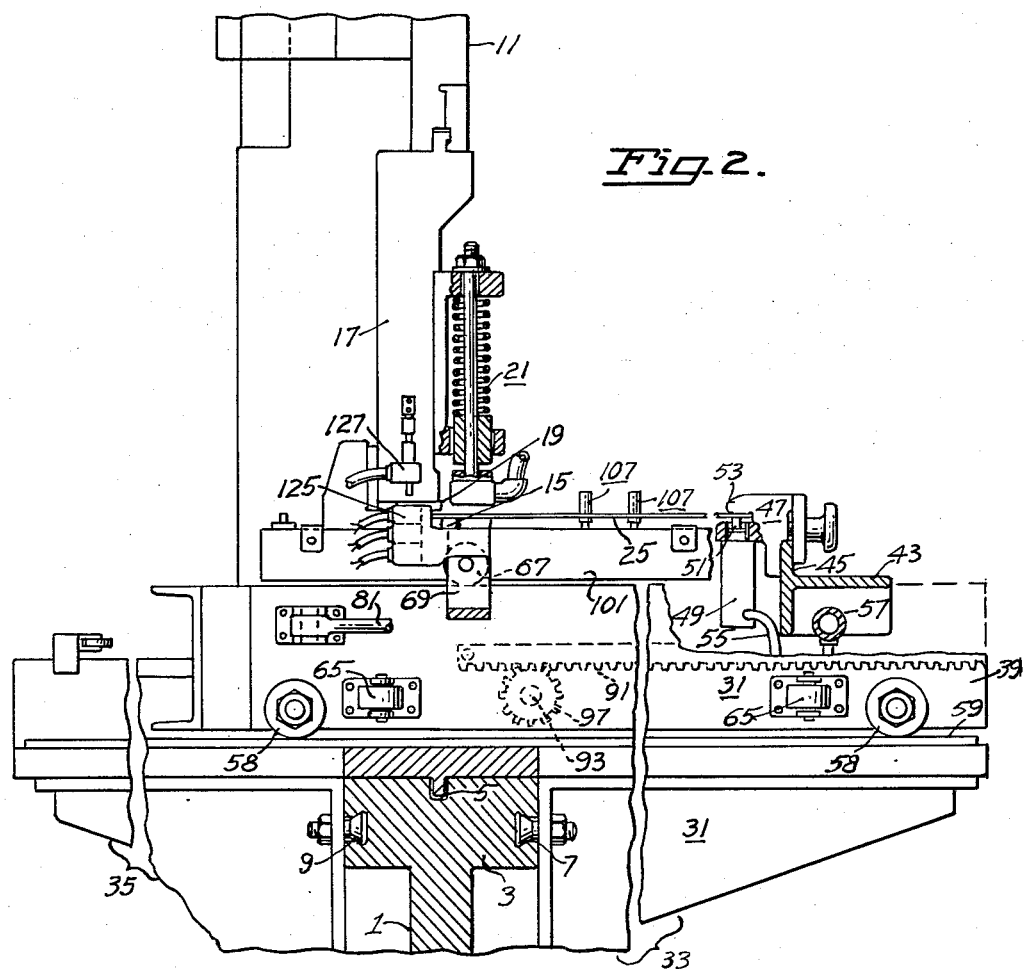
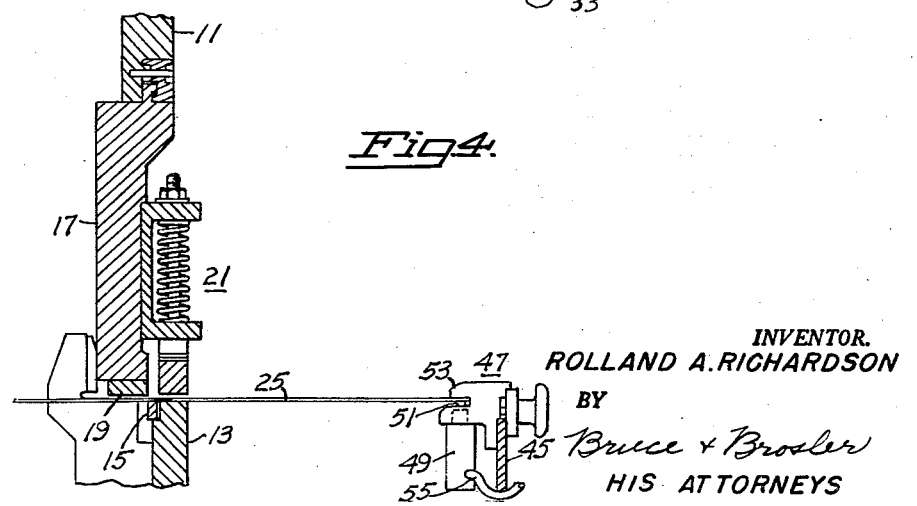

INVENTOR.
ROLLAND A. RICHARDSON
BY
Bruce & Brosler
HIS ATTORNEYS

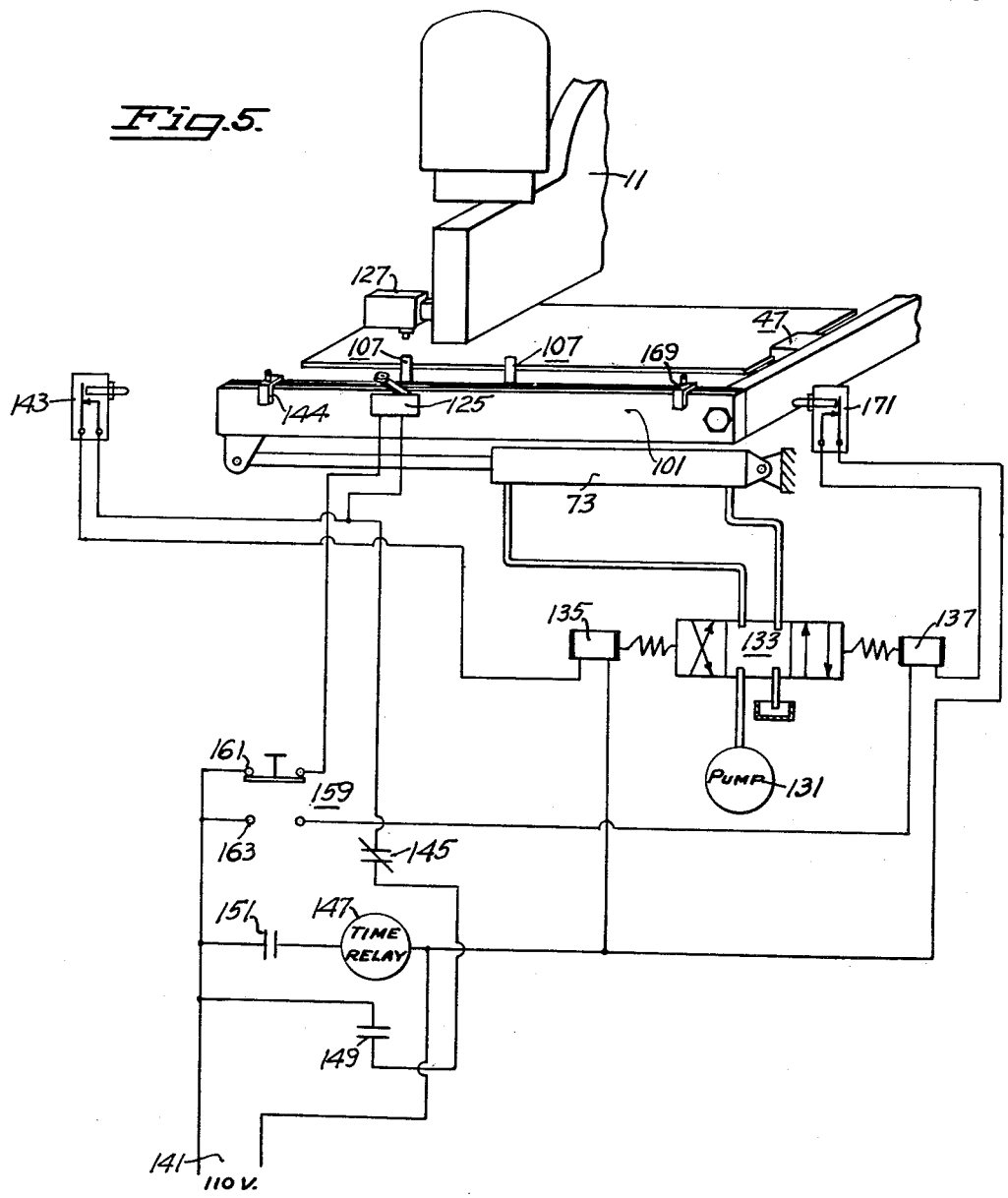

July 6, 1965  R. A. RICHARDSON  3,192,750
SEQUENCE CONTROL FOR MACHINE RAM
Filed Jan. 2, 1962  6 Sheets-Sheet 5

INVENTORS
ROLLAND A. RICHARDSON
BY
Bruce & Broder
THEIR ATTORNEYS

July 6, 1965 R. A. RICHARDSON 3,192,750
SEQUENCE CONTROL FOR MACHINE RAM
Filed Jan. 2, 1962 6 Sheets-Sheet 6

INVENTOR.
ROLLAND A. RICHARDSON
BY
Bruce & Brosler
HIS ATTORNEYS

United States Patent Office 3,192,750
Patented July 6, 1965

3,192,750
SEQUENCE CONTROL FOR MACHINE RAM
Rolland A. Richardson, Alameda, Calif., assignor to Pacific Industrial Manufacturing Co., a corporation of California
Filed Jan. 2, 1962, Ser. No. 163,592
6 Claims (Cl. 72—22)

My invention relates to machines such as press brakes and the like, and more particularly to control means for affecting a sequence of operations on a piece of work.

When it was previously desired to perform a sequence of successive operations on work such as, for example, in the contour bending of a sheet of metal to form a particular shape such as an aerfoil, each successive bending step constituted a separate and independent operation, requiring the resetting of gauges and controls for each such operation. If duplicate items were to be fabricated, then in the interest of efficiency and accuracy, the corresponding bending step in each should be performed before disturbing the setup for the next operation, and this necessitated a removal of the incomplete item following each bending step, in order to perform the corresponding bending operation on the other items.

Among the objects of my invention are:

(1) To provide a novel and improved means for performing a sequence of successive operations on a piece of work;

(2) To provide a novel and improved means for performing a sequence of successive bending operations on sheet material in the contour bending of such material;

(3) To provide a novel and improved means for sequentially altering the control setting of a press brake or the like in accordance with a pre-set pattern of operations;

(4) To provide a novel and improved means for altering the control setting of a press brake or the like while maintaining the ability to re-establish prior settings;

(5) To provide a novel and improved means for establishing a predetermined automatic sequence of control settings in a press brake or the like;

(6) To provide a novel and improved means for automatically contour bending sheet metal.

Additional objects of my invention will be brought out in the following description of a preferred embodiment of the same, taken in conjunction with the accompanying drawings wherein:

FIGURE 2 is a side view in section through the structure of FIGURE 1;

FIGURE 4 is a fragmentary view in section taken in the plane 4—4 of FIGURE 1;

FIGURE 5 is a circuit diagram in conjunction with the schematic showing of related machine components;

FIGURE 6 is a view depicting a modified form of sequence control as applied to a press brake or the like;

Figure 1:
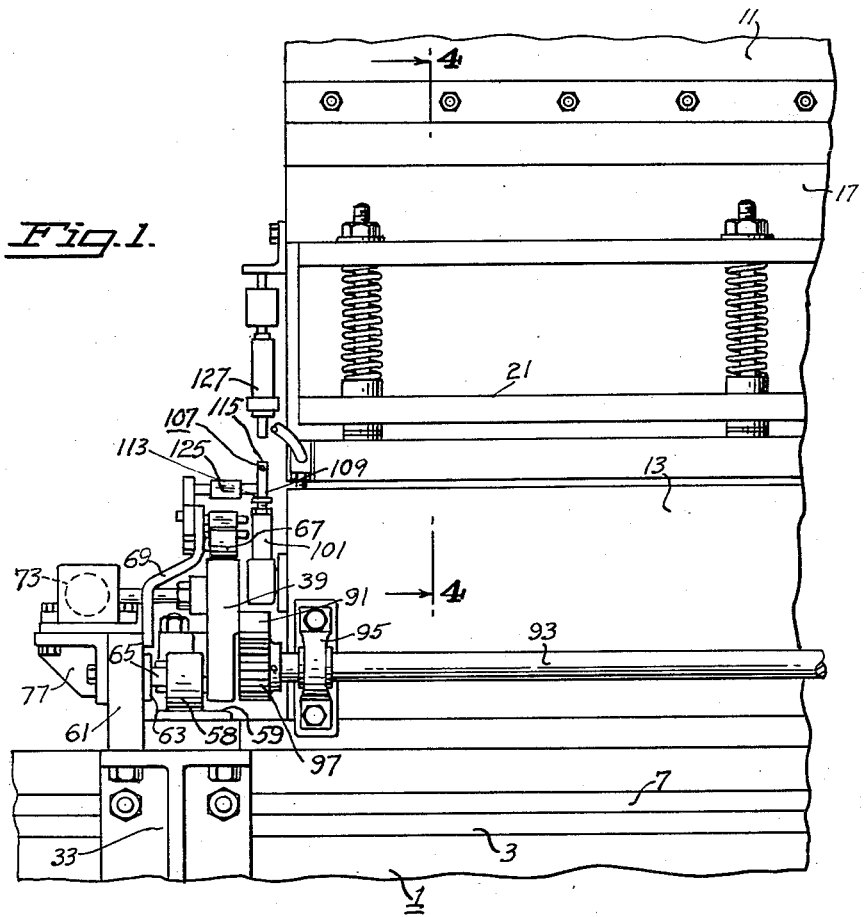
FIGURE 1 is a fragmentary front elevational view of a machine of the press brake type embodying the present invention.
Figure 1A:
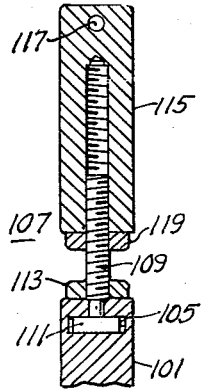
FIGURE 1a is an enlarged view in section of a control element involved in the machine of FIGURE 1.
Figure 3:
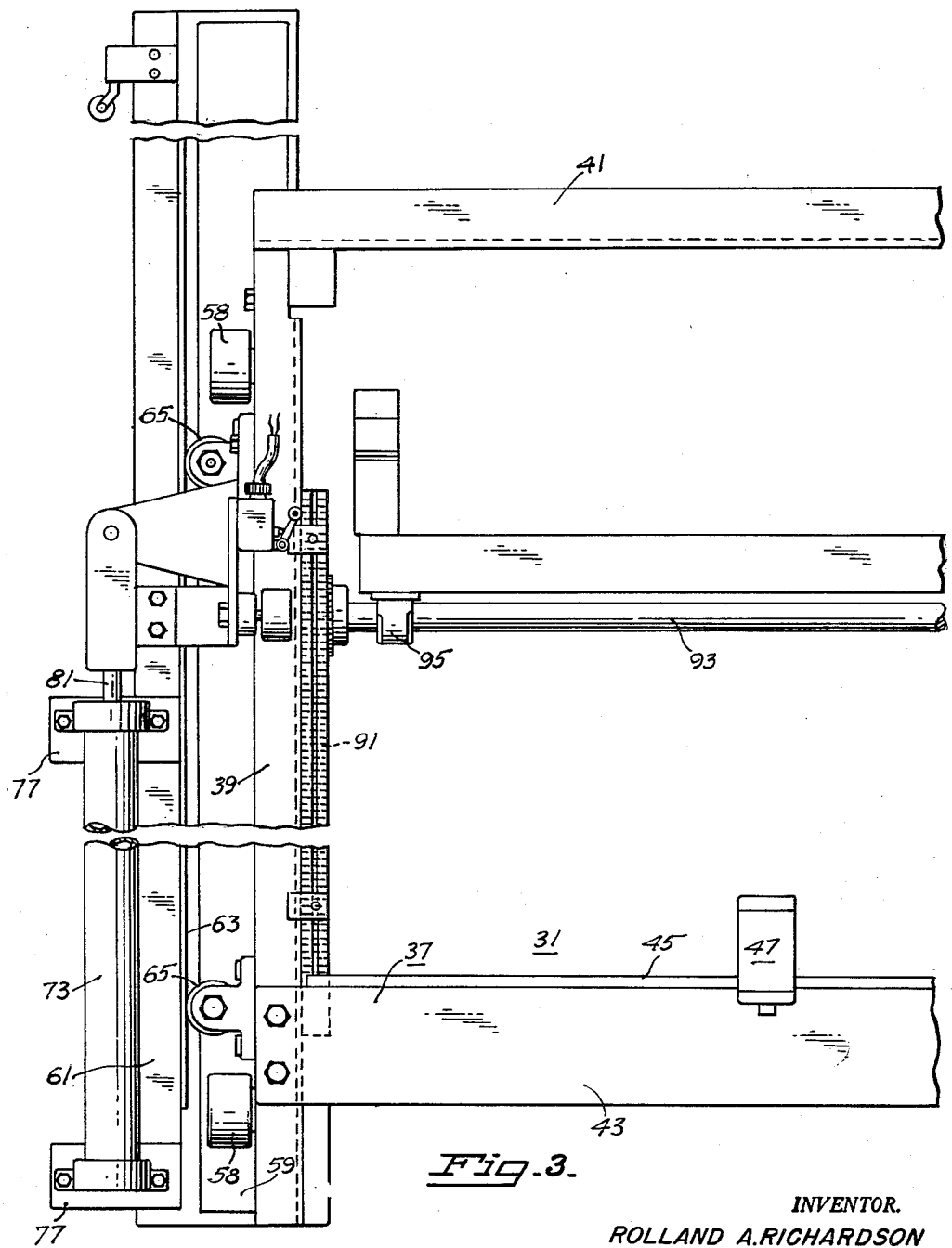
FIGURE 3 is a plan view of that portion of machine depicted in FIGURE 1.

Referring to the drawings for details of my invention, the same has been illustrated as embodied in a machine of the press brake type, only the pertinent components of which have been illustrated. Such components include a vertical bed plate 1 with a platen 3 mounted on the upper edge thereof and provided with an upper center slot 5 and side slots 7 and 9, and a reciprocally mounted ram 11.

The bed plate is adapted to mount a lower die 13 which carries a tool 15, while the reciprocally mounted ram 11 is adapted to mount an upper die 17 behind the plane of the lower die, the upper die being designed to carry a tool 19 for cooperation with the lower tool 15 for effecting an operation on work. For the purpose of illustrating the function of the present invention, such lower tool is in the form of a lower contour bar while the upper cooperating tool is in the form of an upper contour bar, the stroke of the ram 17; for contour bending, being but a fraction of an inch, as contour bending is accomplished through a series of shallow bends.

To the front face of the upper die 17 is bracket mounted, a hold-down assembly 21 in the vertical plane of the lower die 13 and adapted to engage and hold the work such as a sheet of metal 25 against the lower die while the cooperating contour bars are performing their function on the portion of the sheet material exposed thereto.

For supporting a sheet of material, to be moved between the cooperating contour bars for operating on such work, a table assembly 31 is provided, such table assembly including a pair of laterally spaced like brackets 33 extending from the bed plate assembly 1 at the front thereof, and a corresponding pair of like brackets 35 extending from the rear of said bed plate assembly, said brackets cooperating to slideably support a frame like work table 37.

Such work table includes a pair of side frame members 39 slideably supported along the aforementioned brackets, a rear frame member 41, and means coupling said side frame members to the front of the machine for gripping the work, which, as indicated, may be in the form of a sheet of metal to be bent to a desired contour. Such gripping means involves a clamp mounting bar 43 interconnecting the side frame members 39 at the forward ends thereof, said clamp bar including a vertical strip 45 running along an edge thereof to function as a guide strip on which to locate and fix a plurality of work clamps 47.

Each work clamp includes an air cylinder 49 with a clamping rod 51 extending from a piston within such cylinder and adapted to move into engagement with an oppositely disposed lip 53. Each cylinder is supplied with compressed air through a flexible hose coupling 55 connecting into a compressed air supply manifold 57 supported by and between the side frame members 39 of the table, and running beneath the clamp bar 43.

A sheet of metal 25 having one edge inserted into such clamps 47, is adapted to be gripped and held tight; and with the free edge of such sheet supported on the lower contour die, forward movement of the table will cause the sheet to be fed between the contour bars for operations thereon by such bars through proper control of the work table and the ram of the machine.

The table is carried on rollers 58 affixed to the side frame members 39 and rolling on tracks 59 along the aligned brackets 33, 35.

Movement of the table is confined to a linear path determined by a guide wall 61 also mounted upon each pair of aligned table supporting brackets 33, 35, each guide wall carrying a wear strip 63 for rolling engagement by a plurality of guide rollers 65 carried by the proximate side frame member 39 of the table assembly. The table is restrained from lifting or tilting during its linear movement, by rollers 67 mounted in brackets 69 welded to the guide walls 61, these rollers being maintained in rolling engagement with the upper edges of the side frame members.

Drive movement of the table is imparted thereto by a two-way hydraulic drive cylinder 73 which is mounted on one of the guide walls 61 by a pair of spaced angle brackets 77 affixed to the guide wall. A piston in the two-way hydraulic-drive cylinder, has a piston rod 81 extending from the cylinder and coupled at its free end to the proximate side frame member 39 of the table, for imparting movement to the table in accordance with the application of hydraulic power to the cylinder.

It is quite essential that during such movement of the table, synchronism be maintained in the movement of the side frame members 39 of the table, for any tendency on the part of one of the side frame members to move ever so slightly ahead of that of the other side frame member, will result in a slight angular shift of the work, causing the contour bars 15 and 19 to engage the work at a correspondingly slight angle to the desired line of contact and cause erratic contour bending.

To assure the necessary synchronism of movement between the side frame members 39 of the work table, a rack 91 is affixed to the inner side of each of the side frame members, with the teeth thereof in perfect alignment with the corresponding teeth of the opposing rack. A shaft 93 extending transversely of the machine and rotatably mounted in pillow blocks 95 affixed to the forward surface of the lower die 13, carry at each end thereof a pinion 97 in mesh with the proximate rack. With these pinions rigidly affixed to the shaft 93, it will become apparent both side frame members must move in unison.

In performing operations on work, such as in contour bending a sheet of metal in a press brake as, for example, when fabricating an aerfoil, a series of successive bending operations must take place at different points along the metal sheet and to such varying degrees as will produce the desired contour in the finished item. This means, therefor, that the table must move forward with an intermittent motion and with variable spacing between stops, while at each stop of the work, the contour bars must function and to a degree which will vary with the sharpness of the bend required, to eventially obtain the desired contour in the finished item. All this is accomplished in accordance with the present invention, in a very simple manner.

Toward this end, I provide a cam bar 101 running parallel to one of the side frame members of the table and in proximity thereto, by affixing one end thereof to the clamp strip 43, and supporting the other end by means of any suitable bracket, to the proximate side frame member. This cam bar is provided with a T-groove 105 in the upper edge thereof to slideably receive a plurality of stop assemblies 107.

Each such stop assembly includes a threaded shank 109 treminating at one end in a T-head 111 adapted to fit within the T-groove of the cam bar, a nut 113 threaded onto the shank for enabling the shank to be locked to the cam bar at any desired position therealong, and a stop in the form of an elongated cap 115 adapted to be adjustably threaded onto the shank 109. A hole 117 through the upper or free end of the stop, permits of the insertion of a tool for affecting such adjustment. Maintenance of such adjustment may be realized by a lock nut 119 on the threaded shank and adapted to be threaded into locking engagement with the lower end of the cap 115, following an adjustment of such cap. Thus it will be appreciated, that the stop assemblies are each adjustable both as to position along the cam bar and as to elevation, the spacing between stops determining the points on the work at which the contour bars engage to perform a bending step, while the elevational adjustment of each stop determines the extent of bend when such stop comes into operative position.

To control the operation of the machine in accordance with the adjustment and setting of the various stops along the cam bar, a micro-switch 125 is mounted on the bracket 69 in position to be engaged and actuated by the successive stop assemblies 107 as they approach the operating position.

A micro-switch 127 is mounted on the upper die 17 for reciprocal movement therewith, such latter micro-switch being adapted to engage each such stop on the downward or work stroke of the ram, and when actuated by such stop, functions to energize an "up" relay, which reverses movement of the ram which carries the upper die, and causes it to move upwardly with it. A reversing circuit for this purpose is disclosed in the patent to Rolland A. Richardson for Precision Control System for Press Brakes or the Like, No. 2,906,096 of September 29, 1959.

Movements of the work must accordingly occur in timed relationship to the cycling of the ram, and accordingly the stop actuated micro-switch 125 is connected in a circuit which ties in with the operation of the "up" relay, to control flow of hydraulic fluid to the cylinder assembly 73 which drives the table 37.

The cylinder 73 (FIGURE 5) is supplied with pressure fluid from a pump 131 through a reversing valve 133 having a central normal neutral position, and associated with the valve are a pair of solenoids 135, 137, one 135 of which when energized, urging the valve to a position determining advance of the work table, while the other solenoid 137 when energized will determine the return of the table to its initial starting position.

The table advancing solenoid 135 is connected in a circuit extending from one side of a power source 141 through the solenoid, to a normally closed limit switch 143 supported in the path of movement of an adjustable stop 144 on the cam bar 101, then through the slow-acting, normally closed contacts 145 of a time delay relay 147, and a pair of fast-acting normally-open contacts 149 associated with such relay, the circuit then terminating at the other side of the power source. The time delay relay 147 is connected across the power source 141 through a pair of open contacts 151 associated with the "up" relay of the press brake circuit. The contacts 151 are adapted to close when said "up" relay is energized to initiate a return stroke of the ram to its "up" position. Upon closing of such "up" relay contacts 151, the time delay relay 147 becomes energized and instantaneously closes its associated fast acting contacts 149, which in turn causes energization of the advancing solenoid 135 and resulting actuation of the valve 133, which determines supply of pressure liquid to the cylinder 73 in the direction of advancing the work table. Such energization of solenoid 135 lasts only until the slow acting contacts 145 fall out, which in the absence of other factors, would cause the work table to stop. Before this could happen, however, the stop 107 which was in engagement with the micro-switch 125 and holding its contacts open, will have moved out of engagement with said microswitch, thus permitting its contacts to close and establish a holding circuit in shunt with the solenoid 135 and cause continued advancing movement of the work table, until the following stop in the series engages the microswitch 125 to again open the contacts of such switch and break the circuit to the advancing solenoid 135. Thus, this latter stop will come to a halt beneath the microswitch 127 mounted on the upper die.

In the meantime, the ram, upon reaching its upward peak of travel, will automatically bring about the de-energization of the "up" relay and energization of the "down" relay, all in accordance with the teachings of the aforementioned patent of Richardson cited. Such de-energization of the "up" relay will cause the "up" relay contacts 151 in the time delay circuit to open and re-establish conditions in such circuit as they were previously.

Upon completion of the contouring of a work sheet and opening up of the circuit to the advancing solenoid 135 through actuation of the limit switch 143 by the stop 144, the work is released from the clamps and removed from the machine, following which the table is returned to its initial starting position. Such return stroke is initiated through manual depression of a switch 159, preferably of the push-button type which has two pairs of contacts, one pair 161 in the circuit of the micro-switch 125, which pair is normally closed, and the other pair 163 in a circuit connecting the return solenoid 137 across the power source 141. This latter pair is normally open and adapted to be bridged by depressing the switch 159, which action simultaneously opens the circuit to the micro-switch.

The starting position of the table may be determined by release of the switch 159 when the table has arrived at such position, or a limit stop 169 similar to the stop 144, may be adjustably positioned at the other end of the cam bar 101, in which case a micro-switch 171 similar to the micro-switch 143, will be included in the circuit of solenoid 137 in the path of the stop 169, to be opened when abutted by said stop.

It will be apparent also from this circuit, that this manually operated switch 159 may be partially actuated to stop advancing movement of the work table at any point in its forward travel.

Figure 6:
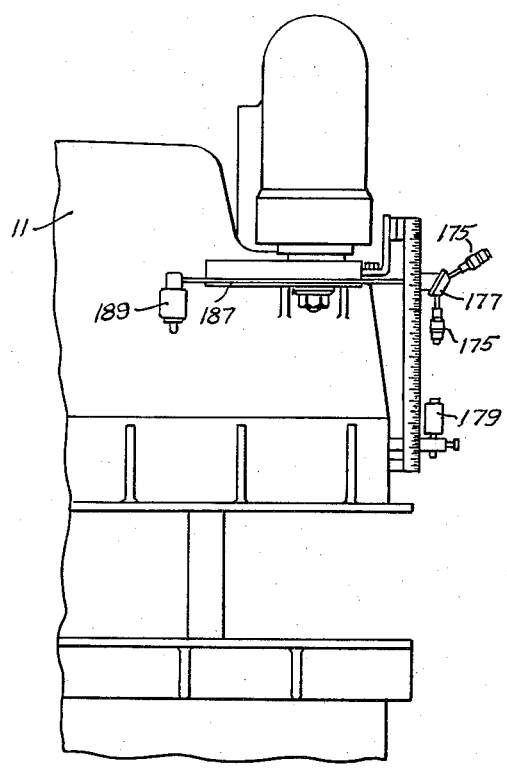
Figure 8:
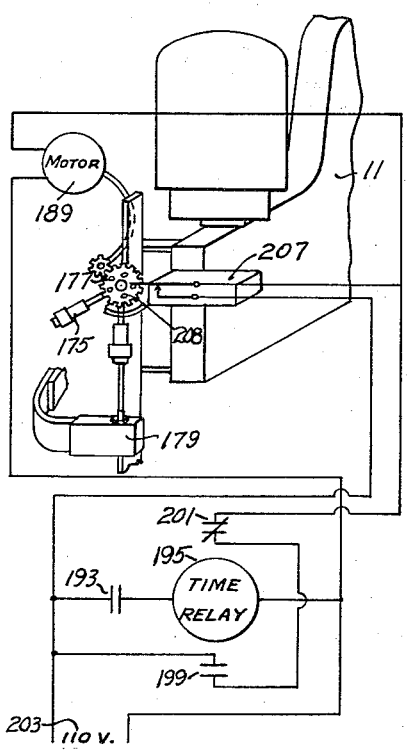
FIGURE 8 is a circuit diagram as applied to the apparatus of FIGURE 7.
Figure 7:
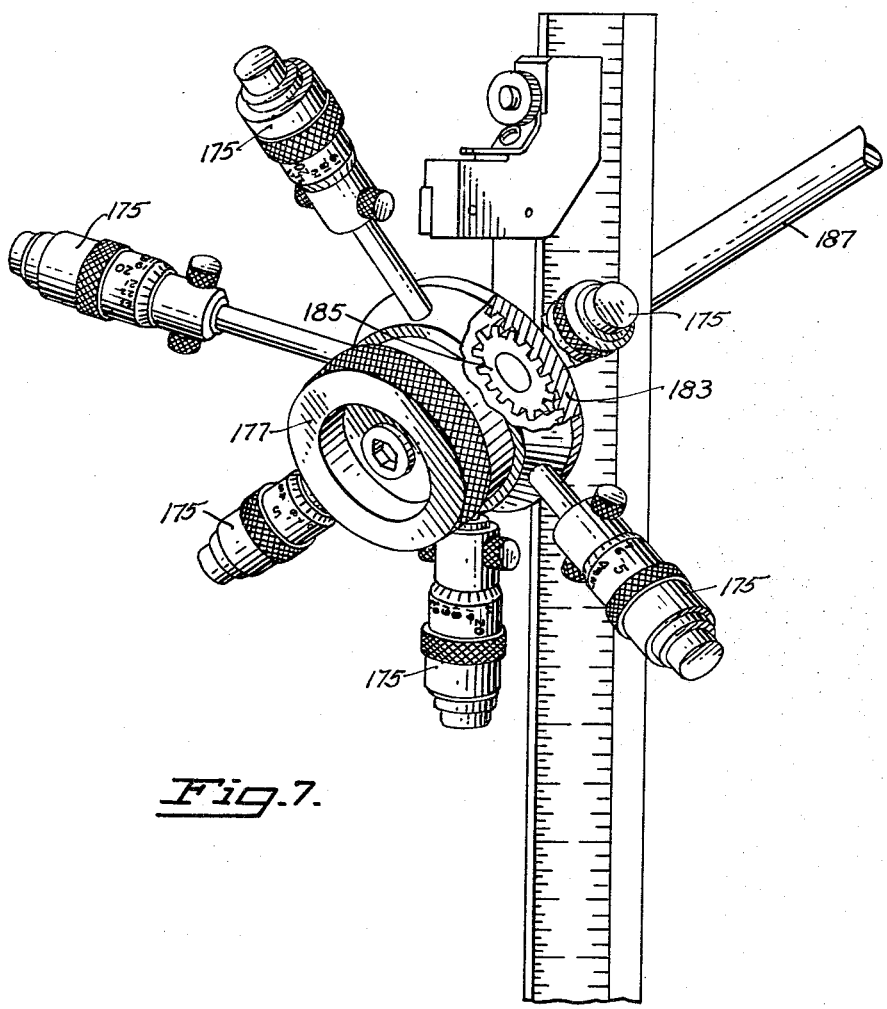
FIGURE 7 is an enlarged view of the sequence control of FIGURE 6.

A modification of the present invention, employable when the nature of the work requires a series of bends in a piece of sheet material, is illustrated in FIGURES 6, 7 and 8 of the drawings. In this embodiment, a plurality of adjustable stops 175, preferably of the micrometer type, are radially disposed about a turret 177 which is so mounted on the end edge of the ram, that each stop, as it is rotated to its lowermost condition, will face a depth limit microswitch 179 supported below on fixed portion of the machine, in position to be engaged by such stop when the ram reaches a desired low point in its downward movement.

If a piece of work requires a series of successive angular bends, of varying degree, the successive strokes of the ram to accomplish such bends are predetermined by advance adjustments of the micrometer stops in succession about the turret. The bending operations under consideration in connection with the turret mounted stops, do not require the use of a frame type table, but relate to an operation where the piece of work will be fed between the bending dies by hand and positioned between such dies where the bending is to occur.

In utilizing the turret stop assembly for such operation, the turret may be rotated manually from one stop to another in succession, or the sequential movement of the stops may be made to occur in response to successive strokes of the ram.

Where the intermittent rotation of the turret is to occur automatically in response to movements of the ram, the turret is fitted with a concentric ring gear 183 which meshes with a drive pinion 185 on the end of a shaft 187, driven by an electric motor 189.

The operating periods of the motor are determined in accordance with energization of the "up" relay of the press brake, such "up" relay, as in the previous embodiment of the invention, has a pair of normally opened contacts 193, which upon energization of the relay, close a circuit through a time delay relay 195. This relay, like the time delay relay 147 of the circuit connected with the prior embodiment of the invention, includes a pair of normally opened fast acting contacts 199 and a pair of normally closed slow acting contacts 201. These two pairs of contacts are connected in circuit with the pinion drive motor 189 across a source of power 203, and in response to energization of the time delay relay 195, the pair of normally open instantaneous contacts 199 close and cause the motor to become energized and go into operation.

In the absence of other factors, such motor would become de-energized or disconnected from the power source immediately upon opening of the slow acting normally closed contacts 201 of the time delay relay, but this is precluded by actuation of a positioning micro-switch 207. Such switch is provided with a pair of normally closed contacts and a switch actuating lever extending into the path of movement of a plurality of pins 208, on the face of the turret, equal in number to the number of stops 175. These pins as they strike the actuating lever, serve to open the normally closed contacts of this switch, but between engagements with such pins, the contacts remain closed.

The period of energization of the motor 189 under control of the time delay relay 195 is such as to permit that pin in contact with the lever of the positioning micro-switch 207, to move out of engagement therewith and allow the micro-switch contacts to close and function as a holding circuit, thus maintaining the motor energized until the following pin on the turret engages the lever and again opens the contacts of the positioning microswitch. This leaves the next functioning stop in position to engage the depth limit switch 179 upon the next down stroke of the ram.

The invention, while described specifically in its application to a press brake, may be employed to great advantage in a power shear, for example, whereone may desire to predetermine the size of cuts from a sheet of material.

From the foregoing description of my invention, it will be apparent that the same fulfills all the objects attributed thereto, and while I have illustrated and described the same in considerable detail, I do not desire to be limited in my protection to the details illustrated and described, except as may be necessitated by the appended claims.

I claim:

1. In a machine having a bed plate adapted to mount a lower tool,
   a reciprocally mounted ram adapted to carry an upper tool for cooperation with the lower tool in effecting an operation on work,
   a table assembly for supporting work for movement between said cooperating tools to process said work,
   said table assembly including
   slidably mounted work advancing means,
   means for moving said work advancing means toward said reciprocally mounted ram and said bed plate,
   and means for halting said work advancing means and actuating said ram in accordance with a predetermined space sequence pattern for halting said work advancing means and a predetermined stroke depth sequence pattern for said ram.

2. In a machine having a bed plate adapted to mount a lower tool,
   a reciprocally mounted ram adapted to carry an upper tool for cooperation with the lower tool in effecting an operation on work,
   a table assembly for supporting work for movement between said cooperating tools to process said work,
   said table assembly including a slidable frame type table,
   said frame type table comprising a frame,
   and means along the front end of said frame for gripping a sheet of metal to be worked on,
   means for moving said frame type table between said reciprocally mounted ram and said bed plate,
   means for contour bending a sheet of metal in said machine in accordance with a predetermined pattern as said table is shifted from one position to another between said ram and said bed plate,
   and means for determining the range limits of movement of said table.

3. In a machine having a bed plate adapted to mount a lower tool,
   a reciprocally mounted ram adapted to carry an upper tool for cooperation with the lower tool in effecting an operation on work,
   a table assembly for supporting work for movement between said cooperating tools to process said work,
   said table assembly including
   a slidable frame type table,
   said frame type table comprising a frame including a pair of side frame members,
   and means along the front and of said frame for gripping a sheet of metal to be worked on,
   means for moving said frame type table between said reciprocally mounted ram and said bed plate,
   and means for contour bending a sheet of metal in said machine in accordance with a predetermined pattern, said means including a cam bar mounted for movement with said table, a series of individual stops positioned along said cam bar and adapted for space adjustments in accordance with points on a sheet of material at which contour bends are to be made, each having means for adjusting the length thereof, a circuit controlling micro-switch mounted for movement with said ram to engage a stop when such stop is in the path of movement of said micro-switch, means actuated by each stop in succession when it reaches the path of movement of said micro-switch, for halting movement of said table and releasing said ram for bending engagement with such work until contact is established between said micro-switch and the proximate stop, means responsive to engagement between said micro-switch and one of said stops for restoring said ram and micro-switch to their starting positions and advance said table and work until the next stop in the series reaches the path of movement of said micro-switch and again halts movement of said table and releases said ram for bending engagement with such work until contact is established between said micro-switch and said latter stop.

4. In a machine having a bed plate adapted to mount a lower tool, a reciprocally mounted ram adapted to carry an upper tool for cooperation with the lower tool in effecting an operation on work, a table assembly for supporting work for movement between said cooperating tools to process said work, said table assembly including a slidable frame type table, said frame type table comprising a frame including a pair of side frame members, and means along the front end of said frame for gripping a sheet of metal to be worked on, means for moving said frame type table between said reciprocally mounted ram and said bed plate, and means for contour bending a sheet of metal in said machine in accordance with a predetermined pattern, said means including a cam bar mounted for movement with said table, said cam bar having a longitudinal T-slot therein, a series of individual stops, each having means for adjusting the length thereof and for positionally locking the same in the T-slot of said cam bar, to enable both space adjustments of said stops in accordance with points on a sheet of material at which contour bends are to be made and length adjustments in accordance with extent of bend at such points, a circuit controlling micro-switch mounted for movement with said ram to engage a stop when such stop is in the path of movement of said micro-switch, means actuated by each stop in succession when it reaches the path of movement of said micro-switch, for halting movement of said table and releasing said ram for bending engagement with such work until contact is established between said micro-switch and the proximate stop, means responsive to engagement between said micro-switch and one of said stops for restoring said ram and micro-switch to their starting positions and energizing said piston to advance said table and work until the next stop in the series reaches the path of movement of said micro-switch and again halts movement of said table and releases said ram for bending engagement with such work until contact is established between said micro-switch and said latter stop.

5. In a machine having a bed plate adapted to mount a lower tool, a reciprocally mounted ram adapted to carry an upper tool for cooperation with the lower tool in effecting an operation on work, a table assembly for supporting work for movement between said cooperating tools to process said work, said table assembly including a slidable frame type table, said frame type table comprising a frame including a pair of side frame members, and means along the front end of said frame for gripping a sheet of metal to be worked on, means for moving said frame type table between said reciprocally mounted ram and said bed plate, means for maintaining synchronism of movement between said side frame members, and means for contour bending a sheet of metal in said machine in accordance with a predetermined pattern, said means including a cam bar mounted for movement with said table, said cam bar having a longitudinal T-slot therein, a series of individual stops, each having means for adjusting the length thereof and for positionally locking the same in the T-slot of said cam bar, to enable both space adjustments of said stops in accordance with points on a sheet of material at which contour bends are to be made and length adjustments in accordance with extent of bend at such points, a circuit controlling micro-switch mounted for movement with said ram to engage a stop when such stop is in the path of movement of said micro-switch, means actuated by each stop in succession when it reaches the path of movement of said micro-switch, for halting movement of said table and releasing said ram for bending engagement with such work until contact is established between said micro-switch and the proximate stop, means responsive to engagement between said micro-switch and one of said stops for restoring said ram and micro-switch to their starting positions and energizing said piston to advance said table and work until the next stop in the series reaches the path of of movement of said micro-switch and again halts movement of said table and releases said ram for bending engagement with such work until contact is established between said micro-switch and said latter stop.

6. In a machine having a bed plate to mount a lower tool, a reciprocally mounted ram adapted to carry an upper tool for cooperation with the lower tool in effecting an operation on work, a table assembly for supporting work for movement between said cooperating tools to process said work, said table assembly including a slidable frame type table, said frame type table comprising a frame including a pair of side frame members, and means along the front end of said frame for gripping a sheet of metal to be worked on, means for reciprocally moving said frame type table between said reciprocally mounted ram and said bed plate, means for maintaining synchronism of movement between said side frame members, said means including a rack on each of said members, a shaft extending transversely of said machine and journalled thereon, and a pinion fixedly mounted on each end of said shaft and in mesh with the proximate rack, and means for contour bending a sheet of metal in said machine in accordance with a predetermined pattern, said means including a cam bar mounted for movement with said table, said cam bar having a longitudinal T-slot therein,
a series of individual stops,
each having means for adjusting the length thereof and for positionally locking the same in the T-slot of said cam bar, to enable both space adjustments of said stops in accordance with points on a sheet of material at which contour bends are to be made and length adjustments in accordance with extent of bend at such points,
a circuit controlling micro-switch mounted for movement with said ram to engage a stop when such stop is in the path of movement of said micro-switch,
means actuated by each stop in succession when it reaches the path of movement of said micro-switch, for halting movement of said table and releasing said ram for bending engagement with such work until contact is established between said micro-switch and the proximate stop,
means responsive to engagement between said micro-switch and one of said stops for restoring said ram and micro-switch to their starting positions and energizing said piston to advance said table and work until the next stop in the series reaches the path of movement of said micro-switch and again halts movement of said table and releases said ram for bending engagement with such work until contact is established between said micro-switch and said latter stop.

References Cited by the Examiner
UNITED STATES PATENTS

| | | | |
|---|---|---|---|
| 2,429,387 | 10/47 | Buchheim. | |
| 2,491,901 | 12/49 | Moohl et al. | 83—222 |
| 2,519,837 | 8/50 | Lampard. | |
| 2,617,176 | 11/52 | McClellan et al. | 83—222 |
| 2,627,890 | 2/53 | Lloyd et al. | 153—21 |
| 2,738,692 | 3/56 | Jones | 83—413 |
| 2,797,724 | 7/57 | Walldow | 153—21 |
| 2,840,135 | 6/58 | Fowler | 153—21 |

FOREIGN PATENTS

| | | |
|---|---|---|
| 874,597 | 8/61 | Great Britain. |

CHARLES W. LANHAM, *Primary Examiner.*

WILLIAM J. STEPHENSON, *Examiner.*